United States Patent
Gusev et al.

(10) Patent No.: US 10,198,474 B2
(45) Date of Patent: Feb. 5, 2019

(54) DELAYING ONE OR MORE SEARCHES TO CAUSE MULTIPLE SEARCHES TO LOAD AND EVALUATE SEGMENTS TOGETHER

(71) Applicant: Quest Software Inc., Aliso Viejo, CA (US)

(72) Inventors: Artem Nikolaevich Gusev, St. Petersburg (RU); Vadim Alexandrovich Senchukov, St. Petersburg (RU)

(73) Assignee: QUEST SOFTWARE INC., Aliso Viejo, CA (US)

( * ) Notice: Subject to any disclaimer, the term of this patent is extended or adjusted under 35 U.S.C. 154(b) by 403 days.

(21) Appl. No.: 15/000,867

(22) Filed: Jan. 19, 2016

(65) Prior Publication Data
US 2017/0206247 A1    Jul. 20, 2017

(51) Int. Cl.
*G06F 17/30* (2006.01)
(52) U.S. Cl.
CPC .............. *G06F 17/30477* (2013.01)
(58) Field of Classification Search
CPC ......... G06F 17/30864; G06F 17/30321; G06F 3/067; G06F 17/30442; G06F 17/30477
See application file for complete search history.

(56) References Cited

U.S. PATENT DOCUMENTS

| | | | |
|---|---|---|---|
| 9,710,644 B2* | 7/2017 | Reybok | G06F 21/552 707/727 |
| 2006/0069672 A1* | 3/2006 | Maloney | G06F 17/30336 707/999.003 |
| 2011/0153662 A1* | 6/2011 | Stanfill | G06F 17/30445 707/774 |
| 2011/0258630 A1* | 10/2011 | Fee | G06F 9/4843 718/101 |
| 2016/0378837 A1* | 12/2016 | Desai | G06F 17/30442 707/727 |

* cited by examiner

*Primary Examiner* — Yuk Ting Choi
(74) *Attorney, Agent, or Firm* — Kirton McConkie; Brian Tucker

(57) ABSTRACT

The performance of a server can be improved by causing multiple searches to load segments of an index and search within them together. When multiple search requests are received and executed within a minimal time difference, the first search can be delayed to allow the second search—and possibly additional searches—to catch up so that the searches do not require loading segments multiple times.

20 Claims, 8 Drawing Sheets

DELAYING ONE OR MORE SEARCHES TO CAUSE MULTIPLE SEARCHES TO LOAD AND EVALUATE SEGMENTS TOGETHER

CROSS-REFERENCE TO RELATED APPLICATIONS

N/A

BACKGROUND

The present invention is generally directed to optimizing the performance of searches. In particular, the present invention can be implemented to cause one or more searches to be delayed so that multiple searches can load segments of an index and search within them together.

In some computing environments, a server provides access to an index which can be searched. In such environments, clients may submit requests to the server for searching the index for specified content. In response, the server will perform the necessary operations to load segments of the index and then search within the loaded segments for the specified content. Under ideal conditions, the server will be capable of executing these searches in an acceptable amount of time. However, in many cases, the server may receive too many searches which may overload the server and cause its performance to suffer. For example, each time a search is executed, the server will be required to load each segment of the index resulting in a large number of disk operations and a large amount of memory consumption. Further, if the index happens to be stored in network storage, these loads will occur over the network which may result in the network becoming congested. When this overloading occurs, a search may be executed in an unacceptably slow manner or may even fail.

To address these overload scenarios, many systems may limit the number of concurrent requests. In such cases, if a client submits a request when the server is overloaded, the server may deny the request. Such denials extend the performance shortcomings to the client. Further, the denials can give the perception that the system is faulty or otherwise unsatisfactory.

BRIEF SUMMARY

The present invention extends to methods, systems, and computer program products for increasing the performance of a server by causing multiple searches to load segments of an index and search within them together. When multiple search requests are received and executed within a minimal time difference, the first search can be delayed to allow the second search—and possibly additional searches—to catch up so that the searches do not require loading segments multiple times.

In some embodiments, the present invention is implemented as a method for optimizing the performance of a server that executes searches of an index. A first client request comprising a first query for searching the index is received. Execution of the first query is commenced. A second client request comprising a second query for searching the index is received. Execution of the second query is then commenced after the first query has commenced execution. The execution of the first query is temporarily delayed while the second query is executed to thereby allow the first query and the second query to load and search segments of the index together.

In other embodiments, the present invention is implemented as a system comprising network storage that stores an index, and a server that is configured to access the network storage to load segments of the index. The server includes an interface for receiving client requests to search the index and a processor for executing the searches. The processor is configured to delay the execution of a first search of the index when a second search of the index is commenced within a minimal time difference. The execution of the first search is delayed until the second search reaches the first search.

In other embodiments, the present invention is implemented as one or more computer storage media storing computer-executable instructions which when executed by one or more processors implement a method comprising: executing a first query; receiving a second query; pausing the execution of the first query while the first query is evaluating a segment to allow the second query to execute until reaching the segment; and when the second query reaches the segment, resuming execution of the first query such that the first and second queries will continue executing by loading and evaluating subsequent segments together.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, an index should be construed as a data structure that stores any type of data in a manner that allows the data to be searched. A segment should be construed generally as a portion of an index that is loaded into memory.

Figure 1:
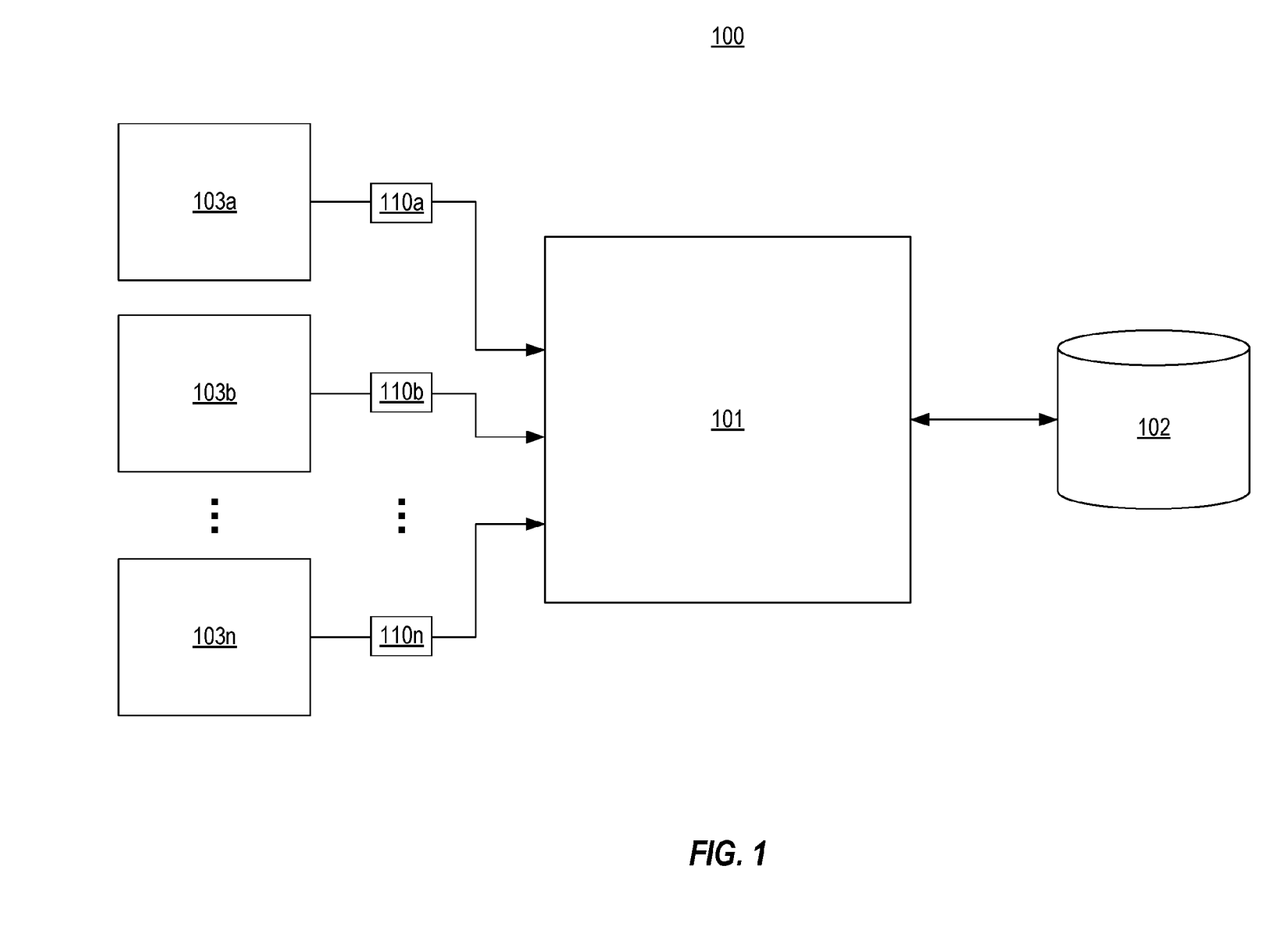
FIG. 1 illustrates an example computing environment in which the present invention can be implemented.

FIG. 1 illustrates an example computing environment 100 in which the present invention can be implemented. Computing environment 100 includes a server 101 that includes or that can otherwise access storage 102. In FIG. 1, storage 102 is depicted as being separate from server 101 to represent embodiments where storage 102 functions as network storage. In other words, server 101 and storage 102 are coupled to a network over which server 101 accesses storage 102. However, the present invention extends to embodiments where storage 102 may be one or more local storage devices (e.g., a local hard drive). Storage 102 is intended to generally represent many different types and/or number of storage devices. Accordingly, the particular configuration of storage 102 is not essential to the present invention.

Server 101 can provide an API by which clients 103a-103n can submit requests to access content stored on storage 102. For example, server 101 may implement a REST API by which clients 103a-103n can submit HTTP requests defining queries for accessing an index stored on storage 102. As represented in FIG. 1, a potentially large number of clients 103a-103n may submit requests 110a-110n at any particular time. As indicated in the background, if too many requests are submitted concurrently, server 101 may experience substantial load that could potentially affect its performance. In particular, if many of these requests are search requests that require that server 101 load and examine each segment of an index, server 101 could potentially be unable to service each request in a timely manner.

To address such issues and in accordance with embodiments of the present invention, server 101 can implement a technique for delaying the execution of at least one search request so that multiple search requests can load segments and search within them together. In this way, server 101 can fulfill the multiple search requests by loading the segments of the index a single time rather than redundantly loading the segments for each search request.

Figure 2:
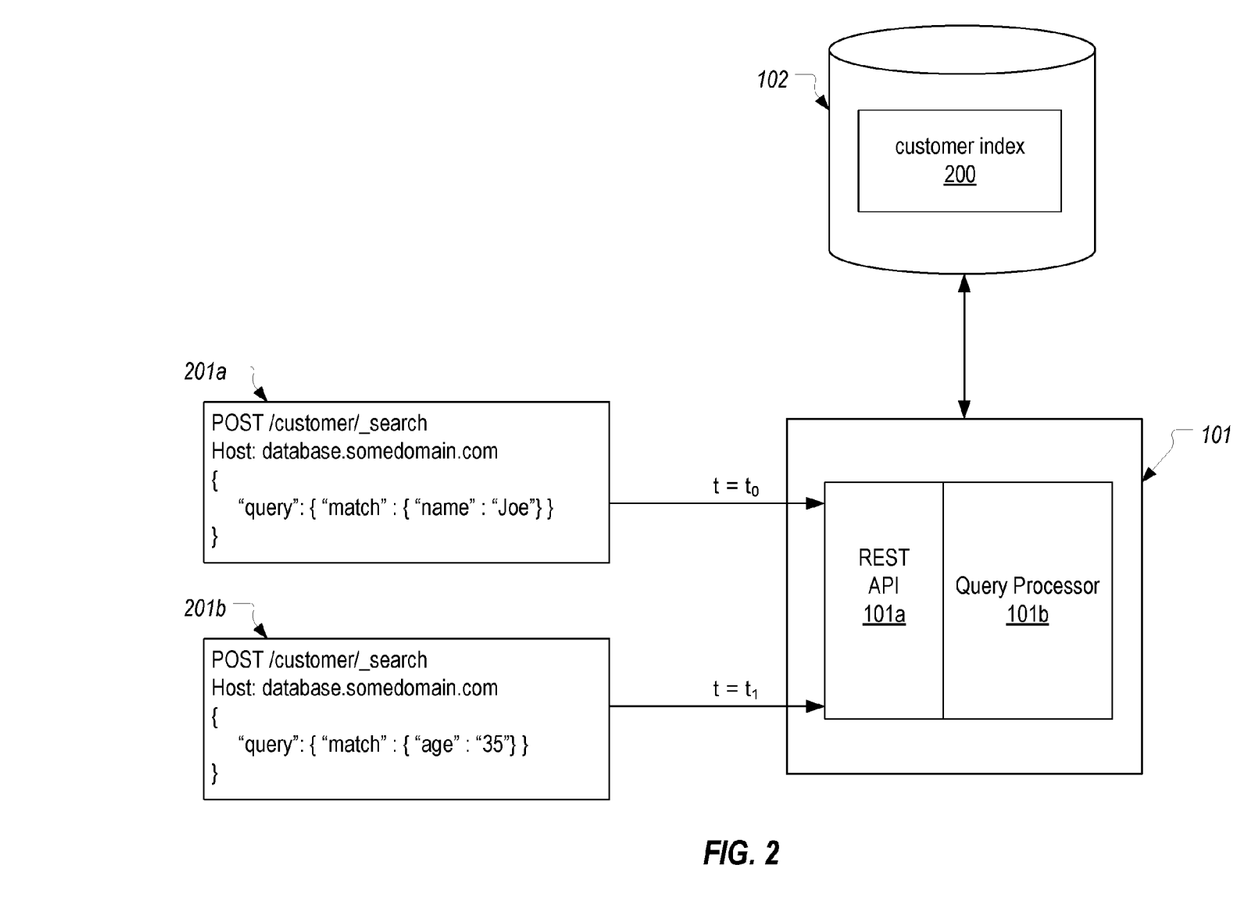
FIG. 2 illustrates how a server can receive client requests to search an index stored on network storage.

FIG. 2 provides a more detailed example of a computing environment in which the present invention may be implemented. In this example, it is assumed that storage 102 stores a customer index 200 and that server 101 provides a REST API 101a through which clients can submit requests for accessing customer index 200. Server 101 is also shown as including a query processor 101b which is configured to execute queries received via REST API 101a including to issue appropriate commands for loading segments of customer index 200 into memory of server 101 and to evaluate such segments in accordance with the parameters of an executed query.

For purposes of this example, it will be assumed that a first query 201a is received at time $t_0$ while a second query 201b is received at a later time $t_1$. Both of queries 201a and 201b comprise search requests of customer index 200 (as indicated by the search parameter in each request). In particular, first query 201a defines a request to search customer index 200 for documents having a name field with a value of Joe, whereas second query 201b defines a request to search customer index 200 for documents having an age field with a value of 35. It is noted that queries 201a and 201b are generally formatted in accordance with the Elasticsearch API which is one example of a REST API that can be employed to provide access to an index. However, the present invention should not be limited to Elasticsearch or any other provider, but should extend to any implementation that allows clients to search an index including those that provide an API other than a REST API for such access.

Although this example refers to queries 201a and 201b being received at different times, the exact timing when each request is received is not critical (e.g., because the queries may not necessarily be executed in the order in which they are received). What is important is when the queries are processed (or executed) as will become apparent below. However, for ease of illustration, the receipt of a request and the commencement of processing of the request will be viewed as occurring simultaneously and referred to interchangeably.

Because queries 201a and 201b are both directed to customer index 200 and both involve searching for documents matching particular parameters, it will be necessary to load each segment of customer index 200 and evaluate each document in customer index 200 against the parameters. In accordance with embodiments of the present invention, query processor 101b can be configured to delay the execution of query 201a so that both queries can load a segment and search within it together thereby eliminating the need to load the segment twice.

Figure 3A:
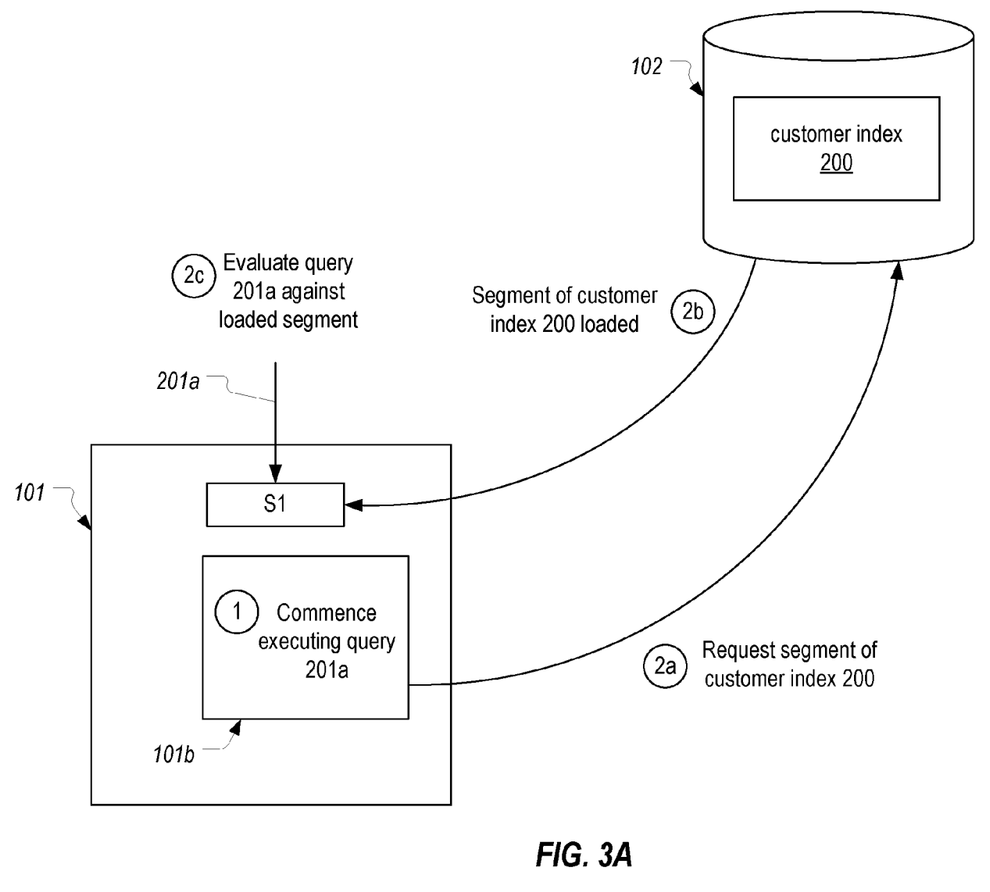
FIGS. 3A-3D illustrate an example of how a query processor can delay the execution of a first query to allow a second query to catch up.
Figure 3B:
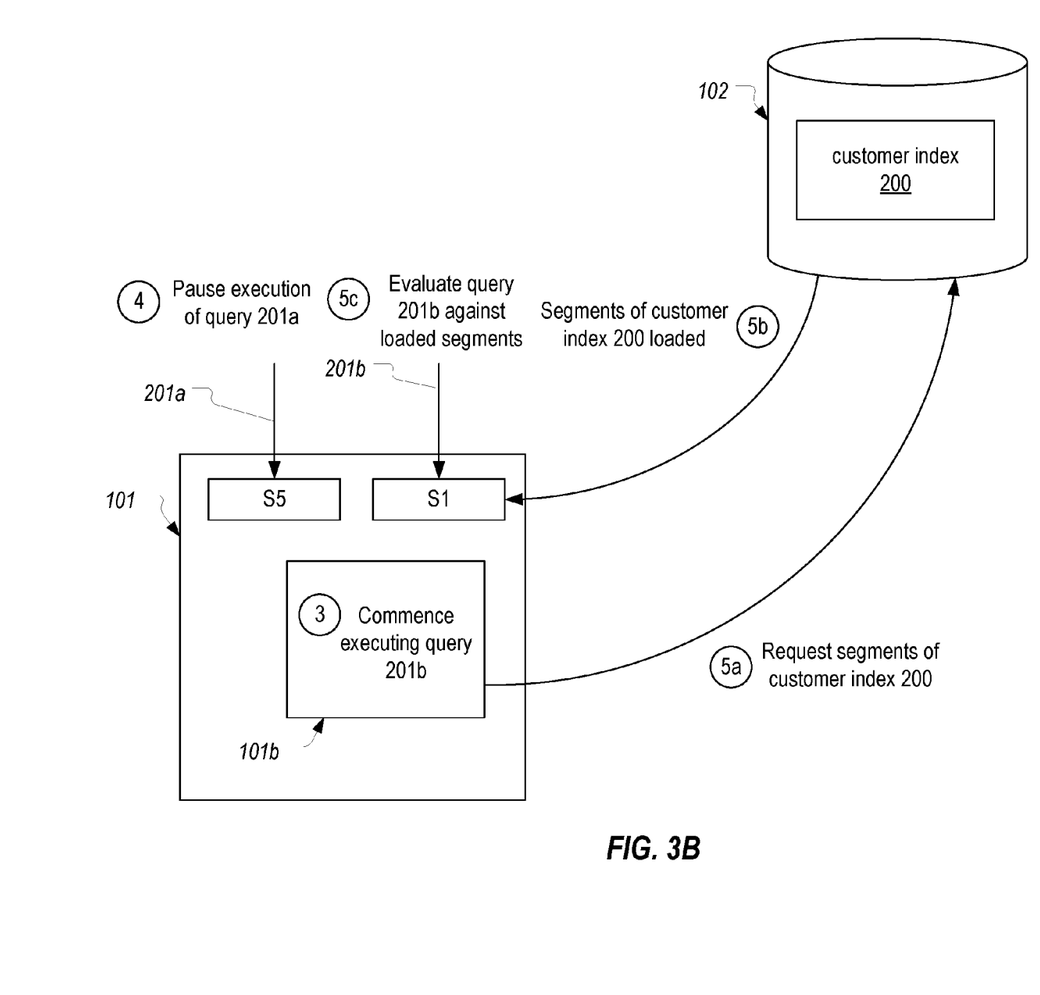
Figure 3C:
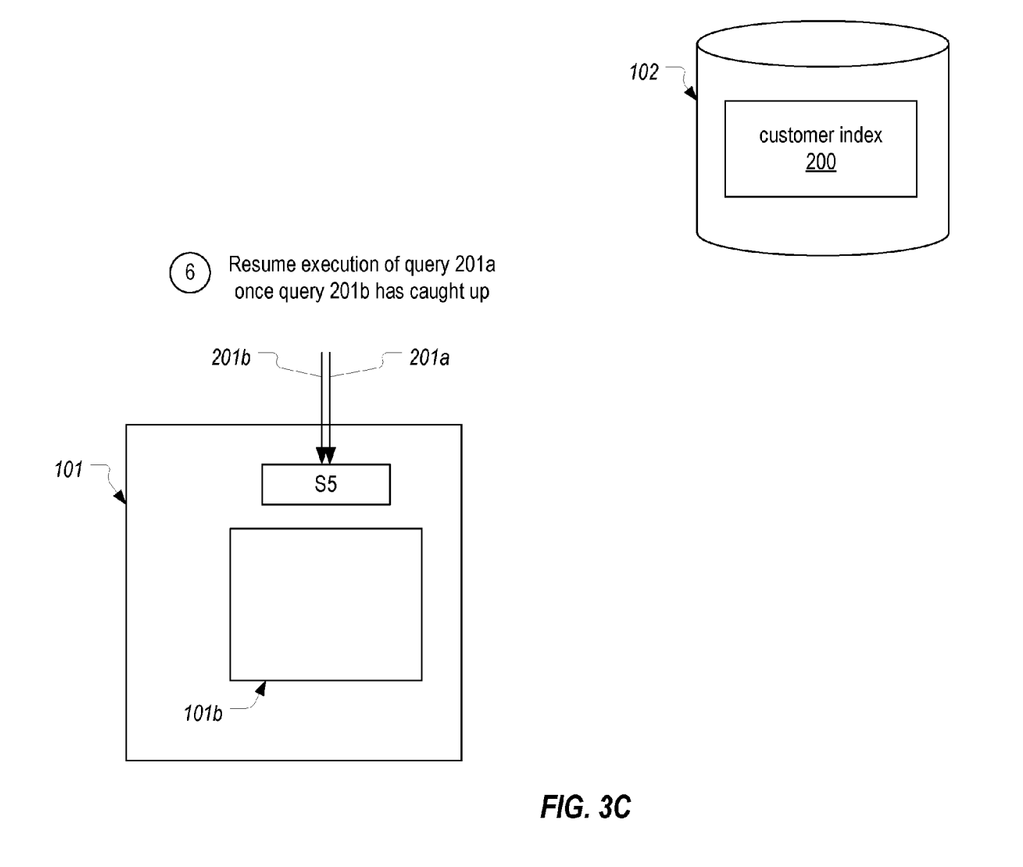

FIGS. 3A-3C illustrate an example of how query processor 101b may delay the execution of query 201a. FIG. 3A illustrates that the execution of query 201a commences in step 1. This involves requesting and loading a first segment, S1, of customer index 200 as depicted in steps 2a and 2b. Once segment S1 is loaded, in step 2c, query processor 101b can commence evaluating query 201a against the segment as represented by the arrow pointing to segment S1

It is emphasized that the loading of a segment would typically occur on an ongoing basis. For example, query processor 101b may request a first segment for evaluation and then, at a later time, request a second segment for evaluation and so on (i.e., customer index 200 would typically comprise a large number of segments). In accordance with memory management techniques, a loaded segment would eventually be overwritten requiring it to be reloaded if it were subsequently needed (e.g., in response to a subsequently received query that is directed to the same segment). For this reason, if query processor 101b determines that another query that accesses the same segments is to be executed shortly after query 201a has commenced execution, it can delay or pause the execution of query 201a so that the other query can catch up thereby ensuring that both queries can be evaluated without having to load the segments twice.

FIG. 3B illustrates this pausing of the execution of query 201a in response to the commencement of execution of query 201b. In FIG. 3B, it is assumed that the execution of query 201a has proceeded to the point that a fifth segment, S5, has been loaded and is being evaluated. At this moment, it is assumed that query 201b is received and that, in step 3, query processor 101b commences the execution of query 201b. Query processor 101b can examine query 201b to determine that it requires accessing the same segments as query 201a and that queries 201a and 201b are within a "minimal time difference" from one another. What is considered a minimal time difference will be addressed in detail below. For purposes of the current example, it will be assumed that the time difference between the execution of the two queries is small enough that the overall performance of server 101 may be enhanced by delaying query 201a. Accordingly, in step 4, the execution of query 201a is paused while segment S5 is being evaluated. With query 201a paused, query processor 101b can commence evaluating query 201b. For example, assuming segment S1 has been flushed from memory, query processor 101b can load segment S1 and evaluate query 201b against it as depicted in steps 5a-5c. Steps 5a-5c can be repeated to load segments S2-S4 (if they were also flushed from memory) and evaluate query 201b against these segments.

Next, as shown in FIG. 3C, the execution of query 201b continues to the point that it has caught up with query 201a (i.e., it has reached segment S5 where query 201a was paused). At this point, query processor 101b can resume the execution of query 201a in step 6 so that both queries 201a and 201b evaluate segment S5 in unison.

Figure 3D:
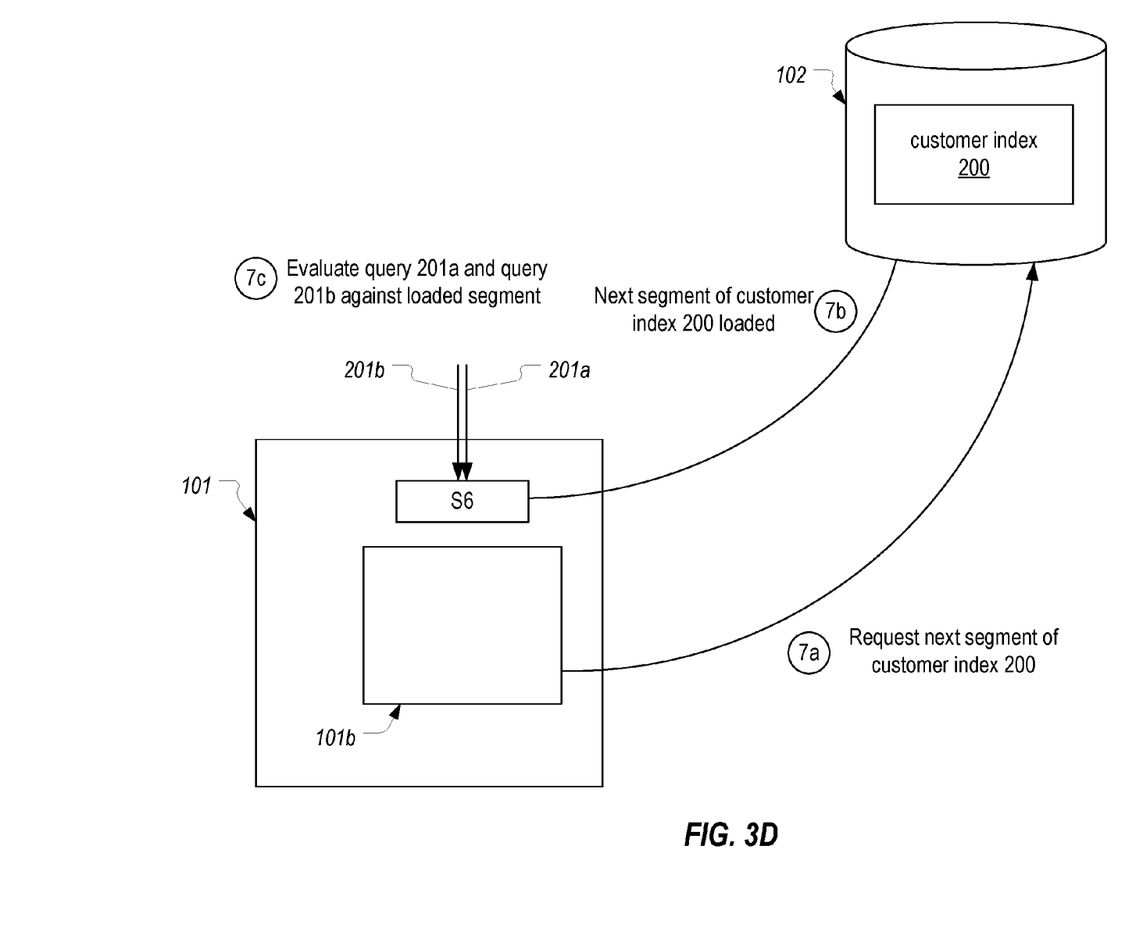

Once the execution of query 201a is resumed, both queries 201a and 201b will continue execution by evaluating the same segment while it is loaded in memory as represented by steps 7a-7c of FIG. 3D. In particular, query processor 101b can process each query against segment S5 then load segment S6 and process each query against it. This process can be repeated until both queries have been evaluated against each segment of customer index 200. As can be seen, this delaying of query 201a can potentially eliminate a large number of load operations while only slightly delaying the completion of query 201a.

Although FIGS. 3A-3D depict a case where two queries are caused to execute in unison, the same techniques could be implemented to cause more than two queries to execute in unison. For example, if a third query were commenced shortly after query 201b, query processor 101b could pause query 201b (e.g., once it caught up to query 201a) to allow the third query to also catch up. The three queries could then be executed in unison.

As indicated above, query processor 101b can be configured to delay a query if a subsequent query is commenced within a minimal time difference. In other words, query processor 101b can estimate how long the query would need to be delayed to allow the subsequent query to catch up. If this estimated delay is within the minimal time difference, query processor 101b can delay the query.

In many embodiments, the determination of whether a subsequent query is within a minimal time difference of a leading query will be adaptive based on current operating conditions of server 101 and/or computing environment 100. For example, the determination may be based on an amount of time required to load a segment. This is particularly true in embodiments where storage 102 is network storage since the load time of a segment may far exceed the time required to evaluate the segment once it is loaded. In such cases, query processor 101b can monitor the amount of time that it takes to load segments to generate an estimated average load time. Then, when the subsequent query is received, query processor 101b can determine whether to pause the leading query based on the estimated average load time and how far ahead the leading query is (e.g., how many segments ahead it is).

Figure 4:
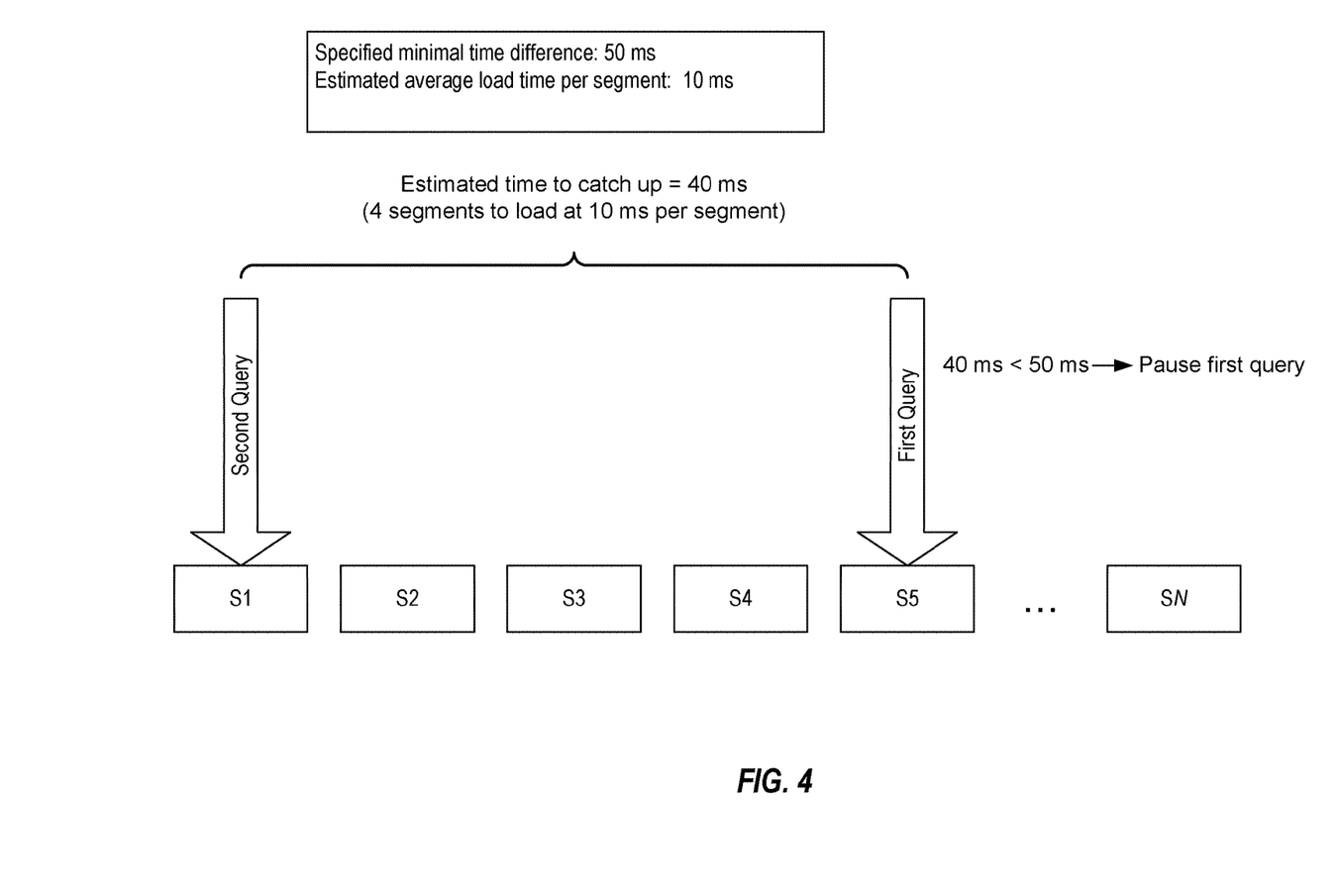
FIG. 4 illustrates an example of how the query processor can determine whether a second query is within a minimal time difference of a first query.

FIG. 4 generally illustrates an example of how query processor 101b may make this determination. FIG. 4 depicts a number of segments (S1 through SN) and represents that a first query is currently evaluating segment S5 when a second query commences execution. In FIG. 4, there is no assumption that any of the segments are actually loaded into memory. It is only assumed that the first query has already evaluated segments S1 through S4 when the second query commences execution. For this example, it will also be assumed that a minimal time difference of 50 ms has been specified and that query processor 101b has estimated an average load time per segment of 10 ms. These values are merely employed as simplified examples and are not intended to represent real world values. This average load time could be calculated based on the actual amount of time it took for the first query and/or any other concurrently executing query to load segments.

Because the first query is currently evaluating segment S5 when the second query commences execution, query processor 101b can calculate that it would likely take approximately 40 ms for the second query to catch up if the first query is paused. In particular, assuming none of segments S1 through S4 are currently loaded in memory, it would require loading all four of segments S1 through S4 with each load taking 10 ms yielding the 40 ms. Of course, this example is overly simplified, and, in actual implementations, additional factors may be considered in this determination. In any case, because the estimated time to catch up of 40 ms is less than the specified minimal time difference of 50 ms, query processor 101b can determine that the first query should be paused to allow the second query to catch up. Then, once the second query catches up, which would assumedly require the first query to be paused for 40 ms, the first and second queries could then be executed in unison. In other words, the first and second query could proceed together loading and evaluating the same segment.

Figure 5:
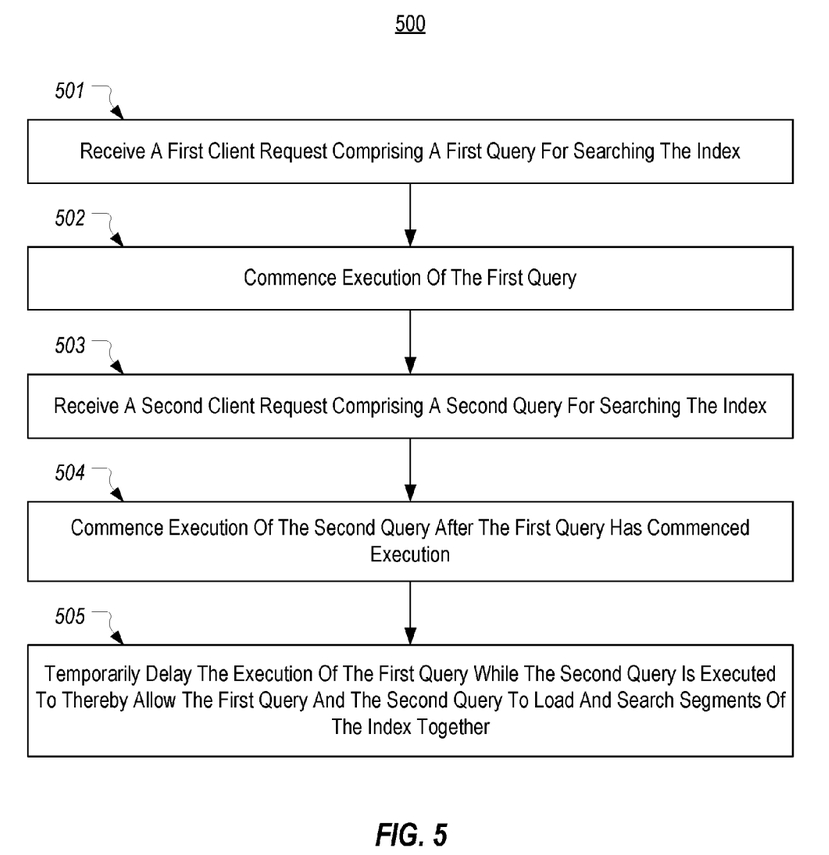
FIG. 5 illustrates a flowchart of an example method for optimizing the performance of a server that executes searches of an index.

FIG. 5 provides a flowchart of an example method 500 for optimizing the performance of a server that executes searches of an index. Method 500 will be described with reference to the example provided in FIGS. 3A-3D.

Method 500 includes an act 501 of receiving a first client request comprising a first query for searching the index. For example, server 101 can receive query 201a.

Method 500 includes an act 502 of commencing execution of the first query. For example, query processor 101b can determine that query 201a is directed to customer index 200 and can load segment S1 for evaluation against query 201a.

Method 500 includes an act 503 of receiving a second client request comprising a second query for searching the index. For example, server 101 can receive query 201b.

Method 500 includes an act 504 of commencing execution of the second query after the first query has commenced execution. For example, query processor 101b can determine that query 201b is also directed to customer index 200.

Method 500 includes an act 505 of temporarily delaying the execution of the first query while the second query is executed to thereby allow the first query and the second query to load and search segments of the index together. For example, while query 201a is evaluating segment S5, query processor 101b can prevent query 201a from loading additional segments while query 201b continues executing up to segment S5 at which point the execution of queries 201a and 201b can load and evaluate subsequent segments together.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for optimizing the performance of a server that executes searches of an index, the method comprising:
   receiving a first client request comprising a first query for searching the index;
   commencing execution of the first query by evaluating the first query against a first segment of the index;
   receiving a second client request comprising a second query for searching the index;
   commencing execution of the second query after the first query has been evaluated against one or more additional segments;
   temporarily delaying the execution of the first query while the second query is evaluated against the first segment and the one or more additional segments; and
   once the second query has been evaluated against the first segment and the one or more additional segments, proceeding with the execution of the first query and the second query together by loading subsequent segments of the index and evaluating the first and second queries against the subsequent segments.

2. The method of claim 1, wherein commencing execution of the first query comprises loading the first segment of the index.

3. The method of claim 1, wherein evaluating the first query against the one or more additional segment comprises loading the one or more additional segments.

4. The method of claim 1, wherein commencing the execution of the second query comprises loading the first segment of the index.

5. The method of claim 1, wherein the first segment and the one or more additional segments are contiguous.

6. The method of claim 1, wherein the one or more additional segments comprise a plurality of additional segments.

7. The method of claim 1, wherein loading the subsequent segments of the index and evaluating the first and second queries against the subsequent segments comprises loading each remaining segment of the index and evaluating the first and second queries against each remaining segment.

8. The method of claim 1, further comprising:
   prior to temporarily delaying the execution of the first query, estimating how long the execution of the first query would have to be delayed to allow the execution of the first and second queries to proceed together; and
   determining that the estimate is within a minimal time difference.

9. The method of claim 8, wherein the estimate is based on an average amount of time required to load segments.

10. The method of claim 8, wherein the estimate is based on how many segments the first query has been evaluated against.

11. The method of claim 1, further comprising:
    receiving one or more additional client requests that each comprise an additional query for searching the index;
    commencing execution of the one or more additional queries after the first and second queries have commenced execution; and
    temporarily delaying the execution of the first and second queries while the one or more additional queries are executed to thereby allow the execution of the first query, the second query, and the one or more additional queries to proceed together.

12. The method of claim 1, wherein temporarily delaying the execution of the first query comprises preventing the first query from loading the subsequent segments of the index.

13. The method of claim 1, wherein the index is stored on network storage.

14. The method of claim 1, wherein the first and second client requests are received from one or more clients via a REST API.

15. A system comprising:
    network storage that stores an index; and
    a server that is configured to access the network storage to load segments of the index, the server including an interface for receiving client requests to search the index and a processor for executing the searches, wherein the processor is configured to perform the following method to optimize the performance of the server:
    receiving a first client request comprising a first query for searching the index;
    commencing execution of the first query by evaluating the first query against a first segment of the index;
    receiving a second client request comprising a second query for searching the index;
    commencing execution of the second query after the first query has been evaluated against one or more additional segments;
    temporarily delaying the execution of the first query while the second query is evaluated against the first segment and the one or more additional segments; and
    once the second query has been evaluated against the first segment and the one or more additional segments, proceeding with the execution of the first query and the second query together by loading subsequent segments of the index and evaluating the first and second queries against the subsequent segments.

16. The system of claim 15, wherein the processor temporarily delays the execution of the first query upon determining that the second query is commenced within a minimal time difference that is calculated at least partially on how many segments the first search has been evaluated against.

17. The system of claim 16, wherein the minimal time difference is also calculated by identifying an average amount of time required to load a segment.

18. The system of claim 15, wherein a first subsequent segment is loaded prior to temporarily delaying the execution of the first query such that proceeding with the execution of the first query and the second query together comprises evaluating the first and second queries against the first subsequent segment that was already loaded and then loading a second subsequent segment and evaluating the first and second queries against the second subsequent segment.

19. One or more computer storage media storing computer-executable instructions which when executed by one or more processors implement a method comprising:

commencing execution of a first query by evaluating the first query against a first segment of an index;

commencing execution of a second query after the first query has been evaluated against one or more additional segments;

based on an estimate of how long the execution of the first query would need to be delayed to allow the execution of the first and second queries to proceed together, temporarily delaying the execution of the first query while the second query is evaluated against the first segment and the one or more additional segments; and once the second query has been evaluated against the first segment and the one or more additional segments, proceeding with the execution of the first query and the second query together by loading subsequent segments of the index and evaluating the first and second queries against the subsequent segments.

20. The computer storage media of claim 19, wherein the execution of the first query is temporarily delayed in response to determining that the estimate is within a minimal time difference.

* * * * *